Aug. 13, 1940.　　　J. D. LANGDON　　　2,211,237

SIPHONLESS VALVE

Filed April 4, 1938

INVENTOR.

J. D. Langdon

Patented Aug. 13, 1940

2,211,237

UNITED STATES PATENT OFFICE 2,211,237

SIPHONLESS VALVE

Jesse D. Langdon, Los Angeles, Calif.

Application April 4, 1938, Serial No. 199,770

7 Claims. (Cl. 137—93)

This application is a continuation in part of U. S. application Serial No. 104,283, filed October 6, 1936, now Patent No. 2,181,900, granted December 5, 1939, for improvements in Pistons and flush valves, and includes other and further improvements thereon.

My invention relates to manually and pressure operated valves, and particularly that type of valves used for flushing toilets and the like, wherein the valve is required to be siphonless when the supply line is under vacuum, with the following objects and purposes in view.

First.—The provision of a valve member, valve seat, bypass passage, relief valve and pressure chamber in cooperable combination whereby the valve member inherently performs the functions of an automatic check valve when the supply side of the valve is subjected to vacuum.

Second.—The construction of a valve member of resilient material of such form that a portion of the valve member will compress and deform in a manner to urge the valve member to its seat after being opened.

Third.—To provide a reenforcement for a piston of deformable material in combination with a bypass passage extension through the valve member, said extension projecting into the inlet passage of the valve so that the bypass passage is subject to maximum pressure at all times.

Fourth.—The provision of a self-cleaning bypass passage and pin.

Fifth.—The provision of a valve cap assembly wherewith all the operating mechanism of the valve are assembled unitary with said valve cap.

Sixth.—The provision of a combined handle stem packing and spring.

With these and further objects in view, as will be set out in the following specification, it is specifically understood that the drawing is for the purpose of illustration only, and the reduction to practice may include such structural form as is within the scope of the claims.

Figure 1:
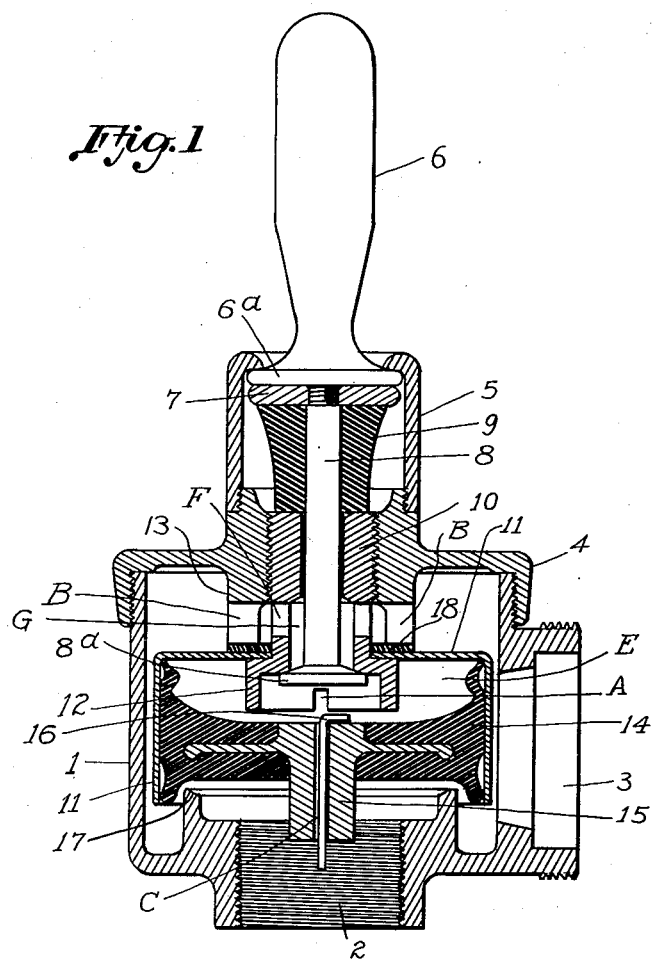
Fig. 1 is a vertical section through the valve body intersecting the inlet and outlet passages, exposing the handle and relief valve in elevation.
Figure 2:
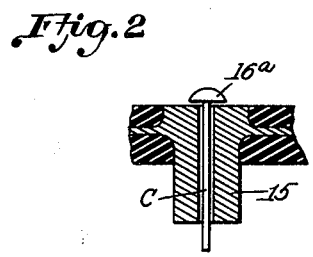
Fig. 2 is a fragmentary view showing a portion of the piston and a modified by-pass control pin.

The construction of my invention includes a valve casing 1 having an inlet 2 and an outlet 3, a cap 4 surmounting said casing 1, a handle cowl 5 surmounting said cap 4 and holding in assembly handle 6 which is retained by inturned end of cowl 5 against handle flange 6a which rests against flange 7 threadedly attached to the relief valve stem 8 having an enlarged seating portion 8a at the lower end of stem 8 which is surrounded by resilient sleeve 9 made of rubberlike material disposed between flange 7 and the guide through the end of assembly screw 10 which retains a cylinder 11 (preferably made of stamped sheet metal) suspended concentric with the cylindrical wall of the casing 1. The resilient sleeve 9 is adapted to seal around the stem 8 between flange 7 and the end of assembly screw 10 and acts both as a spring cushion and packing washer. The assembly screw 10 extends through the closed end of the cylinder 11 and is threaded upwardly into the cap 4, packing washer 18 and spacer lug 13. The assembly screw 10 is provided with a flanged cuplike head 12 forming a spacer for piston 14 in cylinder 11 and having bypass slots A through the wall thereof to permit the flow of liquid over the entire area behind the piston 14 in the pressure chamber E to allow the valve to close by the entry of liquid into the pressure chamber E. A relief valve passage or port G is provided by an enlarged hole forming a clearance space in the lower end of assembly screw 10, the upper and outer end providing a guide for the stem 8. Slots B are provided as relief ports through the wall of cylindrical lug 13 which extends inward from the valve cap 4 providing a clearance space between the top of cylinder 11 and the cap 4. Ports F are provided through assembly screw 10 to permit the passage of liquid from the pressure chamber E through lug 13 into the casing 1 when the relief valve 8a is forced away from its seat.

The valve member or piston 14 in cylinder 11 is provided with a metallic extension 15 projecting into inlet 2 and having a by-pass passage C leading therethrough into pressure chamber E, a pin 16 being provided to fit loosely through passage C. By providing a smaller sized pin the valve timing is shortened by increasing the size of the passage surrounding the pin 16; a larger pin decreases the size of the passage C and lengthens the timing of the valve.

The bypass extension 15 is long enough to project into the restricted portion of inlet passage 2 at all times whether the valve is in open or closed position. This insures the bypass passage C taking off from the point of highest pressure at all times. It has further been discovered that if the end of the extension 15 is rounded it has a stabilizing effect on the piston 14.

The valve seat 17 is enlarged sufficiently to provide a support near the outer periphery of the seating face of the valve member 11. This is necessary in order to prevent the outer periphery of the valve member 14 from being forced downwardly due to the pressure of liquid in the pressure chamber E, as when the seat is of insufficient diameter the piston will distort arching in the center toward the cuplike head or spacer 12 which forms a bumper and spacer to limit the upward movement of the valve member 14. If this large diameter valve seat 17 is not provided to form a supporting shoulder the piston will distort and the valve will fail to open properly due to the tendency of the liquid pressure in the chamber E to force the outer periphery of the valve member downward, it being impossible for the center of member 14 (when arched by pressure or sprung against lug 13) to allow the valve to raise from its seat. Therefore, the enlarged seat exposes a maximum pressure area toward the inlet 2 and is absolutely essential for the successful operation of the valve by preventing undue distortion of member 14.

A packing washer 18 made of rubber, or some other suitable packing material, is provided between the head of cylinder 11 and the spacer head 12 to prevent leakage of liquid from the pressure chamber E.

When the handle 6 is tipped in any direction or pressed on the end flange 6a forces flange 7 and stem 8 to move relief valve 8a from its seat, so that liquid under pressure passing through and over valve seat 17 raises valve member 14 from its seat forcing the liquid in chamber E out through ports G, F and B toward outlet 3 thus allowing the valve to open. When relief valve 8 is reseated the liquid passing through bypass passage C gradually refills the pressure chamber E and forces the piston back to its seat 17 over the inlet port 2 and seat 17. The opening area of seat 17 is greater than the area of the valve member or piston 14 exposed to atmospheric pressure between the outer periphery of seat 17 and the inside edge of the cylinder 11 which projects for a distance lower than the top of seat 17. Thus means are provided by proportional arrangement whereby a greater area of the valve member or piston 14 is forced upwardly at all times by liquid pressure entering through port 2 than the area forced downwardly by pressure within the pressure chamber E exerted beyond and outside of the seat 17 against the narrow outer margin of the valve member 14 which is exposed to atmospheric pressure only on the external side.

It will be noted that the piston 14 as of the drawing is raised slightly from the seat 17, and the upper side of the valve member or piston 14 has a marginal extension projecting upwardly and impinging the head of the cylinder 11. This marginal extension is deformed by compression against the head of cylinder 11 and, due to its elastic qualities, tends to urge the piston 14 toward the seat 17 at all times. The liquid under pressure entering the pressure chamber E forces the marginal extension radially outward against the wall of the cylinder 11 and coacts with the springlike effect of the resilient material to urge the piston 14 toward the seat 17.

By reason of the by-pass pins having a head 16a adapted to serve as a check valve to close by-pass opening C against the pull of vacuum, the evacuation of pressure from chamber E is prevented upon the occurrence of sub-atmospheric pressure within the inlet.

Having described the mechanism of my invention, the operation thereof, and the results obtained, I claim:

1. A siphonless valve comprising a casing having inlet and outlet ports, a cap for said casing, manual operating means surmounting said cap, a stem extending through the top of said cap and surrounded by a combined spring cushion and packing made of elastic material capable of distorting when compressed and returning to normal shape when released, said stem having a relief valve attached to the lower end thereof, said relief valve seating against the lower end of a port formed through the enlarged tubular head of an assembly screw, the upper end of said assembly screw forming a guide for the relief valve stem extending through said cap, said enlarged tubular head formed with a shoulder and supporting a cylinder against a tubular cylindrical spacing lug disposed between said valve cap and said cylinder, said assembly screw being threaded through said cap to hold said cylinder in a unit with said cap, relief ports extending through said assembly screw and laterally through said cylindrical spacing lug to allow the egress of fluid from a pressure chamber formed at one side of a piston in said cylinder, said piston having a marginal portion extended upwardly around its outer rim and compressed against the head of said cylinder, said marginal extension adapted to coact with pressure exerted within said pressure chamber to urge said piston to a seat formed around the inlet port, said piston having a bypass through an extension member integral therewith and protruding at all times into a restricted portion of the inlet port, a bypass pin having a head forming a check valve disposed toward said pressure chamber the valve seat surrounding said inlet port having sufficient diameter to support the outer face of said piston near its peripheral margin.

2. The combination in a valve of the kind described of a casing having an inlet and outlet, a sheet metal cylinder having a closed end and a pressure chamber therein formed by a valve member disposed across the open end thereof, assembly means extending through the closed end of the cylinder and one side of said casing, said assembly element providing a guide for the stem of a relief valve disposed across a relief valve port provided therethrough, and having suitable vent means leading therefrom to permit the evacuation of fluid from said cylinder, a bypass provided through said valve member and communicating between said inlet and said pressure chamber, a pin disposed through said bypass, a spacing element disposed between the closed end of said cylinder and said valve member whereby said bypass pin is prevented from contacting said relief valve, the stem of which extends through the assembly element and the end of said cylinder and one side of said casing, the outer end of the relief valve stem supported by suitable means in connection therewith contacting a resilient sleeve providing a packing to seal around said relief valve stem against the leakage of fluid from said casing.

3. A valve of the kind described comprising a casing having an inlet and an outlet, an inwardly projecting valve seat surrounding said inlet, a cylinder with a closed end in said casing, a piston valve member in said cylinder forming a pressure chamber between the closed end of said cylinder and said piston valve member and being made of flexible deformable material elastic enough to resume its normal shape after being deformed, said piston valve member having a reinforcement in the center thereof and having a lip extending from the outer edge thereof at one end, said lip forming an annular wall around said pressure chamber and contacting the closed end of said cylinder and acting as a resilient cushion to urge said piston valve member toward said valve seat, said piston valve member having a second annular lip extending from the outer edge thereof at the opposite end from said first mentioned lip, said second lip surrounding said inwardly projecting valve seat when said piston valve member is seated, and means for exhausting fluid from said pressure chamber.

4. In the combination recited in claim 3 wherein the by-pass extends through the reinforcement of the piston valve member.

5. The combination recited in claim 3 wherein the bypass extends through the piston valve member and has a loosely mounted pin therein.

6. A piston valve member as in claim 3 having the reinforcement thereof provided with a bypass extension projecting forwardly for a distance into the valve inlet when the piston valve member is in open position.

7. The combination recited in claim 3 wherein the bypass extends through said piston valve member, a pin inserted into said bypass, said pin having a head adapted to serve as a check valve against the evacuation of pressure from the pressure chamber formed between the closed end of the cylinder and said piston valve member.

JESSE D. LANGDON.